United States Patent [19]

Seymour et al.

[11] 4,011,285
[45] Mar. 8, 1977

[54] MOLDING COMPOSITION COMPRISING A BLEND OF POLY(TETRAMETHYLENE TEREPHTHALATE), A POLYETHERESTER AND A RADIAL TELEBLOCK COPOLYMER

[75] Inventors: Robert W. Seymour; Willis C. Wooten, Jr., both of Kingsport, Tenn.

[73] Assignee: Eastman Kodak Company, Rochester, N.Y.

[22] Filed: May 14, 1976

[21] Appl. No.: 687,114

[52] U.S. Cl. .................. 260/873; 260/40 R; 260/876 R; 260/876 B

[51] Int. Cl.² ........................ C08L 67/06

[58] Field of Search ........... 260/873, 876 B, 876 R, 260/40 R, 42.52, 42.18

[56] References Cited

UNITED STATES PATENTS

| | | | |
|---|---|---|---|
| 3,013,914 | 12/1961 | Willard | 154/43 |
| 3,023,192 | 2/1962 | Shivers | 260/75 |
| 3,281,383 | 10/1966 | Zelinski et al. | 260/23.7 R |
| 3,405,198 | 10/1968 | Rein et al. | 260/873 |
| 3,435,093 | 3/1969 | Cope | 260/873 X |
| 3,723,574 | 3/1973 | Brinkman et al. | 260/873 |
| 3,763,109 | 10/1973 | Witsiepe | 260/75 R |
| 3,953,394 | 4/1976 | Fox et al. | 260/40 R |
| 3,963,802 | 6/1976 | Shih | 260/873 |
| 3,980,610 | 9/1976 | Conard | 260/40 R |

FOREIGN PATENTS OR APPLICATIONS 1,814,073  7/1969  Germany .................. 260/873

OTHER PUBLICATIONS

T878,004, Sept. 1970, Seaton et al., 260/615 B.

*Primary Examiner*—Murray Tillman
*Assistant Examiner*—T. DeBenedictis, Sr.
*Attorney, Agent, or Firm*—D. B. Reece, III; Charles R. Martin

[57] ABSTRACT

A composition comprised of poly(tetramethylene terephthalate), a polyetherester and a radial teleblock copolymer. This composition exhibits the combination of a desirable overall balance of general mechanical properties and an unobviously high impact strength.

7 Claims, No Drawings

MOLDING COMPOSITION COMPRISING A BLEND OF POLY(TETRAMETHYLENE TEREPHTHALATE), A POLYETHERESTER AND A RADIAL TELEBLOCK COPOLYMER

This invention relates to compositions which can be molded into articles having a combination of a desirable overall balance of general mechanical properties and an impact strength which is unobviously high.

The use of thermoplastic polymers for molding useful articles has increased tremendously in the last several decades. Today, the wide variety of articles molded from thermoplastic polymers ranges from small articles to large articles and from articles for low strength service to articles for high strength service.

One of the most desirable classes of thermoplastic polymers for molding articles for high strength service applications is polyesters. Polyesters are reasonable in cost, can be handled easily and can be molded with little difficulty.

One of the most desirable thermoplastic polyesters for molding articles for high strength service is poly(tetramethylene terephthalate). Poly(tetramethylene terephthalate) is desirable for molding articles for high strength service because this polyester exhibits a desirable overall balance of most mechanical properties, such as tensile strength, flexural modulus and the like. Although articles molded from poly(tetramethylene terephthalate) do exhibit a desirable overall balance of general mechanical properties, the impact strength of articles molded from poly(tetramethylene terephthalate) is relatively low. Consequently, poly(tetramethylene terephthalate) is often useful for high strength service applications because of its desirable overall balance of general mechanical properties, but the use of poly(tetramethylene terephthalate) for some high strength applications has been limited by its low impact strength.

We have now overcome the above described deficiency in poly(tetramethylene terephthalate) and have invented a poly(tetramethylene terephthalate) containing composition that can be molded into articles which have a combination of a desirable overall balance of general mechanical properties and an exceptionally high impact strength.

The compositions of this invention can be very broadly regarded as comprised of an admixture of poly(tetramethylene terephthalate), a polyetherester, and a radial teleblock copolymer.

The compositions of this invention are thought to be patentable because the compositions exhibit a combination of an unobviously high impact strength and a desirable overall balance of other mechanical properties. This combination of properties is thought to be unobvious over the combination of properties that one would expect from an admixture of poly(tetramethylene terephthalate), the polyetherester and the radial teleblock copolymer.

As is well known in the art, when polymeric materials are blended together the properties of the combination of the materials tends to reflect the characteristics of each component of the blend. Thus, if polymeric material A is blended with polymeric material B and the value of a selected property observed, and if polymeric material A is then blended with polymeric material C and another value of the same property observed, then a blend of polymeric materials A, B and C would be expected to exhibit a value somewhere in between the two values of the selected property observed for each of the two component blends. Surprisingly, we have found that the impact strength of a blend of poly(tetramethylene terephthalate), a polyetherester and a radial teleblock copolymer is not somewhere in between the values of impact strength for the blend of poly(tetramethylene and polyetherester or the blend of poly(tetramethylene terephthalate) and radial teleblock copolymer, but, quite surprisingly, is unobviously greater than the impact strength of either a blend of poly(tetramethylene terephthalate) and the polyetherester or a blend of poly(tetramethylene terephthalate) and the radial teleblock copolymer.

The composition of this invention can be broadly described as a composition comprised of, based on the weight of the composition, an admixture of A. from 96 to 70 weight percent poly(tetramethylene terephthalate) having an inherent viscosity of at least 0.5, B. from 2 to 15 weight percent of a polyetherester having an inherent viscosity of at least 0.4 selected from the group consisting of
  1. a first polyetherester comprised of
    A. a dicarboxylic acid component comprised of
      a. 100–60 mole percent terephthalic acid, and
      b. 0–40 mole percent of an aliphatic or aromatic dicarboxylic acid having a molecular weight of less than 300, and
    B. a diol component comprised of
      a. a glycol comprised of 100–60 mole percent tetramethylene glycol and 0–40 mole percent of an aliphatic or aromatic glycol having a molecular weight of less than 300, and
      b. 10–60 weight percent, based on the weight of the polyetherester, of a poly(alkylene oxide)glycol having 2, 3, or 4 carbon atoms in the repeating unit and having a molecular weight in the range of 400 to 5,000,
    wherein the sum of the total mole percent amount of aliphatic or aromatic dicarboxylic acid having a molecular weight of less than 300 in part B.(1)(A)(b), the mole percent amount of aliphatic or aromatic glycol having a molecular weight of less than 300 in part B.(1)(B)(a), and the weight percent, based on the weight of the polyetherester, of the poly(alkylene oxide)glycol in part B.(1)(B)(b) equals at least 35 but does not exceed 80,
  2. a second polyetherester comprised of
    A. a dicarboxylic acid component comprised of terephthalic acid, and
    B. a diol component comprised of
      a. a glycol comprised of 90–60 mole percent 1,4-cyclohexanedimethanol and 10–40 mole percent ethylene glycol or tetramethylene glycol, and
      b. 10–50 weight percent, based on the weight of the polyetherester, of a poly(alkylene oxide)glycol having 2 to 4 carbon atoms in the repeating unit and having a molecular weight in the range of 400 to 2,000.

C. from 2 to 15 weight percent of a radial teleblock copolymer prepared by a method which comprises polymerizing monomers selected from the group consisting of conjugated dienes and vinyl-substituted aromatic compounds in the presence of an organomonolithium initiator and reacting the resulting monolithium-terminated polymer with from 0.1 to about 1 equivalent, based on the lithium in the polymer, of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

In the most preferred embodiment, the composition can be described as a composition comprised of, based on weight of the composition, an admixture of A. from 90 to 83 weight percent poly(tetramethylene terephthalate) having an inherent viscosity of at least 0.5, B. from 5 to 10 weight percent of the second polyetherester having an inherent viscosity of at least 0.4 comprised of
1. a dicarboxylic acid component comprised of terephthalic acid,
2. a diol component comprised of
   a. a glycol comprised of 80–70 mole percent 1,4-cyclohexanedimethanol and 20–30 mole percent tetramethylene glycol, and
   b. 25–35 weight percent, based on the weight of the polyetherester, of poly(tetramethylene oxide)-glycol having a molecular weight of about 1,000, C. from 5 to 7 weight percent of the radial teleblock copolymer composed of from 60 to 80 mole percent butadiene and 40 to 20 mole percent styrene.

The polyester useful in this invention is comprised of terephthalic acid and 1,4-butanediol, and is called poly(tetramethylene terephthalate) or poly(butylene terephthalate). In some cases a small portion of the terephthalic acid may perhaps be replaced with another dicarboxylic acid as long as the unobvious properties of the composition of the invention are maintained. Examples of other dicarboxylic acids are oxalic, malonic, dimethylmalonic, succinic, glutaric, adipic, 2-methyladipic, trimethyladipic, pimelic, 2,2-dimethylglutaric, 3,3-diethylsuccinic; azelaic, sebacic, suberic, fumaric, maleic, 1,2-cyclopentanedicarboxylic, 1,3-cyclopentanedicarboxylic, 1,2-cyclohexanedicarboxylic, 1,3-cyclohexanedicarboxylic, 1,4-cyclohexanedicarboxylic, 1,4-cyclohexenedicarboxylic, phthalic, terephthalic, isophthalic, 4-methylisophthalic, t-butylisophthalic, 1,4-naphthalic, 4,4'-sulfonyldibenzoic, 2,5-naphthalenedicarboxylic, 2,6-naphthalenedicarboxylic, and 2,7-naphthalenedicarboxylic acids. It will be understood that the corresponding esters of the dicarboxylic acids, such as dimethyl terephthalate, are included in the term "dicarboxylic acid".

In some cases a portion of the 1,4-butanediol can be replaced with a small amount of another diol if the unobvious properties of the composition of the invention are maintained. Examples of diols are ethylene glycol, diethylene glycol, 1,2-propylene glycol, 2,4-dimethyl-2-ethylhexane-1,3-diol, 2,2,4-trimethyl-1,3-pentanediol, 2,2-dimethyl-1,3-propanediol, 2-ethyl-2-butyl-1,3-propanediol, 2,2-diethyl-1,3-propanediol, 2-methyl-2-propyl-1,3-propanediol, 3-ethyl-2-isobutyl-1,3-propanediol, 1,3-butanediol, 1,4-butanediol, 1,4-butenediol, 1,5-pentanediol, 1,6-hexanediol, 1,10-decanediol, 2,2,4-trimethyl-1,6-hexanediol, 1,4-cyclohexanediol, 1,2-cyclohexanedimethanol, 1,3-cyclohexanedimethanol, and 1,4-cyclohexanedimethanol.

The poly(tetramethylene terephthalate) of this invention can be prepared in accordance with techniques well known in the art, such as direct esterification, ester interchange and acidolysis. Preferably the polyesters are prepared by ester interchange. In this procedure, the dicarboxylic acid components are esterified with an alcohol to form a diester, such as dimethyl terephthalate, and the diester is ester interchanged with excess glycol to form a low molecular weight polymer which is then polycondensed at high temperature and low pressure into a high molecular weight polymer.

The poly(tetramethylene terephthalate) of this invention has an inherent viscosity of at least 0.5, preferably at least 1.0 and can be as high as 2.5 and is measured at 25° C. using 0.25 grams of polymer per 100 ml. of a solvent composed of 60 volumes of phenol and 40 volumes of tetrachloroethane.

In this invention from 96 to 70, preferably 90 to 83 weight percent poly(tetramethylene terephthalate), based on the weight of the composition, can be used.

The first polyetherester useful in this invention can be broadly described as a poly(tetramethylene terephthalate) type polyetherester.

As broadly described above, the dicarboxylic acid that is used in conjunction with terephthalic acid can be aliphatic or aromatic dicarboxylic acid having a molecular weight of less than 300.

Aliphatic dicarboxylic acids, as the term is used herein, refers to carboxylic acids having two carboxyl groups each attached to a saturated carbon atom. If the carbon atoms to which the carboxyl group is attached is saturated and is in a ring, the acid is cycloaliphatic and is included within the term "aliphatic dicarboxylic acid". Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in an isolated or fused benzene ring. It is not necessary that both functional carboxyl groups be attached to the same aromatic ring and where more than one ring is present, they can be joined by aliphatic or aromatic divalent radicals containing other substituents such as —O— or —SO$_2$—.

Representative aliphatic dicarboxylic acids which can be used in this invention are sebacic acid, 1,3-cyclohexane dicarboxylic acid, 1,4-cyclohexane dicarboxylic acid, adipic acid, pimelic acid, suberic acid, sebacic acid, glutaric acid, succinic acid, carbonic acid, oxalic acid, azelaic acid, diethyl-malonic acid, allyl-malonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are 1,4-cyclohexane dicarboxylic acid, adipic acid, pimelic acid, suberic acid, azelaic acid, or sebacic acid.

Representative aromatic dicarboxylic acids which can be used include phthalic and isophthalic acid, dibenzoic acid, substituted dicarboxy compounds with two benzene nuclei such as bis(p-carboxyphenyl)methane, 4,4'-oxydibenzoic acid, ethylene-bis(p-oxybenzoic acid), 1,5-naphthalene dicarboxylic acid, 2,6- naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used provided an aromatic dicarboxylic acid is also present. Aromatic carboxylic acids with 8–16 carbon atoms are preferred, particularly the phenylene dicarboxylic acids, i.e., phthalic and isophthalic acids.

In a preferred embodiment of this invention the dicarboxylic acid component is comprised of 85–60 mole percent terephthalic acid and 15–40 mole percent 1,4-cyclohexanedicarboxylic acid.

The term "dicarboxylic acids", as used with regard to the first polyetherester, includes equivalents of dicarboxylic acids having two functional carboxyl groups which perform substantially like dicarboxylic acids in reaction with glycols and diols informing copolyester polymers. These equivalents include esters and ester-forming derivatives, such as acid halides and anhydrides. The molecular wieght requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituents groups or combinations which do not substantially interfere with the copolyester polymer formation and use of the polymer of this invention.

While broadly the glycol that can be used to replace the tetramethylene glycol can be an aliphatic or aromatic glycol having a molecular weight of less than 300, more preferably the glycol can be an aliphatic or aromatic glycol having up to 12 carbon atoms. Examples of suitable glycols are ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Other suitable diols are aliphatic diols containing 2–8 carbon atoms. Included among the bisphenols which can be used are bis(p-hydroxy) diphenyl, bis(p-hydroxyphenyl) methane, and bis(p-hydroxyphenyl) propane. Equivalent ester-forming derivatives of diols are also useful. The term "aliphatic or aromatic glycol" as used herein includes equivalent ester-forming derivatives; however, the molecular weight requirement pertains to the diol only and not to its derivatives.

In a preferred embodiment of this invention the glycol can be 100 mole percent tetramethylene glycol.

As broadly described above, the poly(alkylene oxide) glycol useful in this invention can be described as a poly(alkylene oxide)glycol having 2,3 or 4 carbon atoms in the repeating unit and having a molecular weight in the range of 400–5,000. In a preferred embodiment the poly(alkylene oxide) glycol can be described as a poly(tetramethylene oxide) glycol having a molecular weight in the range of 800–4,000 wherein the amount is 20–50 weight percent, based on the weight of the polyetherester. Examples of poly(alkylene oxide) glycols that can be used include poly(ethylene oxide) glycol, poly(propylene oxide) glycol and poly(tetramethylene oxide) glycol. These glycols are well known in the art and are disclosed in Defensive Publication No. T878,004 of Sept. 8, 1970, entitled "Poly(tetramethylene Glycol) Having a Narrow Molecular Weight Distribution And Its Manufacture", by Seaton et al.

It is essential that at least 60 mole percent of the dicarboxylic acid component be terephthalic acid and at least 60 mole percent of the diol component be tetramethylene glycol, sometimes called 1,4-butanediol. A further requirement of this invention is that the sum of the dicarboxylic acid that is not terephthalic acid, the glycol that is not tetramethylene glycol and the poly(alkylene oxide) glycol be within a certain range. Specifically, the sum of the total mole percent amount of aliphatic or aromatic dicarboxylic acid having a molecular weight of less than 300, the mole percent amount of aliphatic or aromatic glycol having a molecular weight of less than 300 and the weight percent, based on the weight of the polyetherester, of the poly(alkylene oxide) glycol must equal at least 35 but cannot exceed 80. For example, if 15 mole percent of the glycol is other than tetramethylene glycol and 10 mole percent of the dicarboxylic acid used is other than terephthalic acid, than the weight percent poly(alkylene oxide) glycol must be at least 10. Additionally, if 20 mole percent of the glycol is other than tetramethylene glycol and 40 mole percent of the dicarboxylic acid is other than terephthalic acid then the weight percent poly(alkylene oxide) glycol can be no greater than 20.

The first polyetheresters described herein are well known in the art and can be prepared in accordance with the disclosure of U.S. Pat. Nos. 3,013,914 and 3,763,109.

In this invention the first polyetherester has an inherent viscosity of at least 0.4 and preferably 0.6, or even higher, measured at about 25° C. using 0.5 percent of the polymer in a solvent composed of 60 percent by weight of phenol and 40 percent by weight of tetrachloroethane. Inherent viscosities of between 1.0 and 2.0 are often preferred.

The second polyetherester useful in this invention can be broadly described as a poly(1,4-cyclohexylenedimethylene terephthalate) type of polyetherester.

As reported earlier, the dicarboxylic acid component of the polyetherester is comprised of terephthalic acid. Minor amounts of other aliphatic and aromatic dicarboxylic acids having a molecular weight of less than 300 can be used in conjunction with the terephthalic acid as long as the unobvious properties of the composition of the invention are preserved. Examples of aliphatic dicarboxylic acids which can be used in conjunction with terephthalic acid are sebacic acid, 1,3-cyclohexanedicarboxylic acid, 1,4-cyclohexanedicarboxylic acid, adipic acid, pimelic acid, suberic acid, glutaric acid, succinic acid, carbonic acid, oxalic acid and azelaic acid. Examples of aromatic dicarboxylic acids which can be used in conjunction with terephthalic acid are isophthalic acid, dibenzoic acid, substituted dicarboxy compounds with two benzene nuclei such as bis(p-carboxyphenyl)methane, 4,4'-oxydibenzoic acid, ethylene-bis(p-oxybenzoic acid), 1,5-naphthalene dicarboxylic acid, 2,6-naphthalene dicarboxylic acid, 2,7-naphthalene dicarboxylic acid and 4,4'-sulfonyl dibenzoic acid.

The term "dicarboxylic acids", as used with regard to the second polyetherester, includes equivalents of dicarboxylic acids having two functional carboxyl groups which perform substantially like dicarboxylic acids in reaction with glycols and diols in forming copolyester polymers. For example, the term "dicarboxylic acids" include the bis alkyl ester, such as dimethyl terephthalate.

As disclosed previously, the glycol useful in the second polyetherester of this invention is a mixture of 1,4-cyclohexanedimethanol and a specific range of tetramethylene glycol or ethylene glycol. Minor amounts of other glycols can be used in conjunction with the mixture of 1,4-cyclohexanedimethanol and tetramethylene glycol or ethylene glycol as long as the unobvious properties of the composition of the invention are preserved. While broadly the glycol that can be used in conjunction with the 1,4-cyclohexanedimethanol and tetramethylene glycol can be an aliphatic glycol having a molecular weight of less than 300, in a preferred embodiment, the glycol can be an aliphatic glycol having up to 12 carbon atoms. Examples of suitable glycols are propylene, ethylene, pentamethylene, 2,2-dimethyltrimethylene, hexamethylene, and decamethylene glycols.

In one preferred embodiment of the invention, the diol component is comprised of 80-65 mole percent 1,4-cyclohexanedimethanol and 20-35 mole percent tetramethylene glycol. More preferably the diol component is comprised of 80-70 mole percent 1,4-cyclohexanedimethanol and 20-30 mole percent tetramethylene glycol.

As broadly described above, the poly(alkylene oxide) glycol useful in this invention is a poly(alkylene oxide) glycol having 2 to 4 carbon atoms in the repeating unit and having a molecular weight in the range of 400-2,000, preferably about 1000. Examples of poly(alkylene oxide) glycols that can be used include poly(ethylene oxide) glycol, poly(propylene oxide) glycol and poly(tetramethylene oxide) glycol. Copoly(alkylene oxide) glycols, such as poly(ethylene/propylene oxide) glycol, can be used. In a preferred embodiment, the poly(alkylene oxide) glycol can be poly(tetramethylene oxide) glycol. Glycols of the type useful in this invention are well known in the art.

In one preferred embodiment of the invention, 20-40 weight percent poly(alkylene oxide)glycol can be used. More preferably the poly(alkylene oxide) glycol is 25-35 weight percent.

The second polyetherester of this invention can be prepared in accordance with the disclosure of U.S. Pat. Nos. 3,023,192, 3,013,914, and 3,763,109.

In this invention the second polyetherester has an inherent viscosity of at least 0.4 and preferably 0.6, or even higher, measured at about 25° C. using 0.5 percent of the polymer in a solvent composed of 60 percent by weight of phenol and 40 percent by weight of tetrachloroethane.

In this invention from 2 to 15, preferably 5 to 10 weight percent, of the first or second polyetherester, based on the weight of the composition, can be used.

The radial teleblock copolymer useful in this invention is an elastomeric rubbery type polymer consisting of several conjugated diene chains, such as polybutadiene, extending from a central hub with each polymerized conjugated diene branch terminated by a block of a vinyl-substituted aromatic compound, such as styrene. The polymerized conjugated diene and blocks of vinyl-substituted aromatic compound are incompatible and form a two-phase system consisting of "domains" of glassy polymerized vinyl-substituted compound interconnected by flexible polymerized conjugated diene chains. The "domains" of polymerized vinyl-substituted aromatic compound serve to crosslink and reinforce the structure, giving rise to an elastomeric network which behaves as though it were filled and chemically crosslinked. These polymers and their preparation are thought to be disclosed in U.S. Pat. No. 3,281,383. These polymers are sold commercially by Phillips Petroleum Company under the trade name Solprene.

In accordance with U.S. Pat. No. 3,281,383 the radial teleblock copolymer can be prepared by a method which comprises polymerizing monomers selected from the group consisting of conjugated dienes and vinyl-substituted aromatic compounds in the presence of an organomonolithium initiator and reacting the resulting monolithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound. In a preferred embodiment the conjugated diene is butadiene and the vinyl-substituted aromatic is styrene. Preferably, the amount of butadiene is 60 to 80 mole percent and the amount of styrene is 40 to 20 mole percent.

In this invention, from 2 to 15, preferably 5 to 7 weight percent, based on the weight of the composition, radial teleblock copolymer can be used.

The composition of this invention can be prepared according to techniques well known in the art. For example, granules of the poly(tetramethylene terephthalate) and granules of the polyetherester and radial teleblock copolymer can be dry blended and extruded. Also the three components can be melt blended with conventional equipment, such as a Banbury type mixer. The preferred method is to mechanically mix the polyetherester and radial teleblock copolymer as powder or pellets, melt blend the mixture, and then conduct the melt blended mixture through a screw type extruder with the poly(tetramethylene terephthalate).

The compositions of this invention can be molded into useful articles using conventional apparatus and techniques. For example, articles can be prepared from the compositions of this invention using conventional injection molding equipment and methods.

The properties of the composition of the invention can be modified by incorporation of various conventional additives such as pigments, inorganic fillers such as carbon black, silica gel, alumina, clays, chopped fiber glass, and flame retardants. Suitable conventional stabilizers can be added if desired.

As has been described, the compositions of this invention exhibit the combination of a desirable overall balance of general mechanical properties and an unobviously high impact strength. In order to illustrate the desirable combination of properties of the compositions of this invention, a series of comparative experiments are conducted.

A composition of the invention is prepared as shown below:

A. 90 weight percent poly(tetramethylene terephthalate) having an inherent viscosity of 1.05, B. 5 weight percent of the second polyetherester having an inherent viscosity of 1.17 comprised of 1. a dicarboxylic acid component comprised of terephthalic acid,
2. a diol component comprised of
   a. a glycol comprised of 83 mole percent 1,4-cyclohexanedimethanol and 27 mole percent tetramethylene glycol, and
   b. 30 weight percent, based on the weight of the polyetherester, of poly(tetramethylene oxide) glycol having a molecular weight of about 1,000,
C. 5 weight percent of a radial teleblock copolymer sold commercially by Phillips Petroleum Company under the trade name Solprene 411C, which is thought to be prepared by polymerizing about 70 mole percent butadiene and about 30 mole percent styrene in accordance with the process disclosed in U.S. Pat. No. 3,281,383.

Components B. and C. are mixed thoroughly as dry particles and extruded. The resultant blend is then mixed with the poly(tetramethylene terephthalate) and extruded to form the admixture of the invention, which is injection molded into 5 × ½ × ⅛ inch flexural bars and ASTM Type 1 tensile bars using a 100° C. mold on a New Britain injection molding machine. Similar moldings are prepared from an admixture of the poly(tetramethylene terephthalate) and polyetherester and an admixture of the poly(tetramethylene terephthalate) and radial teleblock copolymer.

In order to investigate the impact strength of all three of these compositions the notched Izod impact strength in ft.-lb./in. of notch was measured at several temperatures in accordance with ASTM D 256 for the composition of the invention, the admixture of poly(tetramethylene terephthalate) and polyetherester, and the admixture of the poly(tetramethylene terephthalate) and radial teleblock copolymer. These data are presented below.

|  | Notched Izod Impact Strength | | | |
| --- | --- | --- | --- | --- |
|  | 23° C. | −18° C. | −29° C. | −40° C. |
| Admixture of poly(tetramethylene terephthalate) and polyetherester | 0.86 | 0.79 | 0.61 | 0.60 |
| Admixture of poly(tetramethylene terephthalate) and radial teleblock copolymer | 0.83 | 0.78 | 0.68 | 0.50 |
| Admixture of invention of poly(tetramethylene terephthalate), polyetherester and radial teleblock copolymer | 1.27 | 1.20 | 1.15 | 1.04 |

As will be readily appreciated from a consideration of these data, the notched Izod impact strength of the composition of the invention, composed of an admixture of poly(tetramethylene terephthalate), polyetherester and radial teleblock copolymer, is not, as would be expected, somewhere in between the notched Izod impact strength of an admixture of poly(tetramethylene terephthalate) and the polyetherester or an admixture of poly(tetramethylene terephthalate) and the radial teleblock copolymer, but, quite unobviously, the notched Izod impact strength of the composition of the invention is much higher than the notched Izod impact strength of either the admixture of poly(tetramethylene terephthalate) and the polyetherester or the admixture of poly(tetramethylene terephthalate) and the radial teleblock copolymer. For example, consider the impact strength at −40° C. The notched Izod impact strength is 0.60 for the admixture of poly(tetramethylene terephthalate) and polyetherester and is 0.50 for the admixture of poly(tetramethylene terephthalate) and radial teleblock copolymer, but, quite remarkably, is 1.04 for the composition of the invention.

The general overall balance of mechanical properties of the composition of the invention was investigated and determined to be similar to that of poly(tetramethylene terephthalate), and, accordingly, quite acceptable for high strength service.

We claim:
1. A composition comprised of, based on the weight of the composition, an admixture of
A. from 96 to 70 weight percent poly(tetramethylene terephthalate) having an inherent viscosity of at least 0.5,
B. from 2 to 15 weight percent of a polyetherester having an inherent viscosity of at least 0.4 selected from the group consisting of
   1. a first polyetherester comprised of
      A. a dicarboxylic acid component comprised of
         a. 100–60 mole percent terephthalic acid, and
         b. 0–40 mole percent of an aliphatic or aromatic dicarboxylic acid having a molecular weight of less than 300, and
      B. a diol component comprised of
         a. a glycol comprised of 100–60 mole percent tetramethylene glycol and 0–40 mole percent of an aliphatic or aromatic glycol having a molecular weight of less than 300, and
         b. 10–60 weight percent, based on the weight of the polyetherester, of a poly(alkylene oxide) glycol having 2, 3 or 4 carbon atoms in the repeating unit and having a molecular weight in the range of 400 to 5,000,
      wherein the sum of the total mole percent amount of aliphatic or aromatic dicarboxylic acid having a molecular weight of less than 300 in part 1.B.(1)(A)(b), the mole percent amount of aliphatic or aromatic glycol having a molecular weight of less than 300 in part 1.B.(1)(B)(a), and the weight percent, based on the weight of the polyetherester, of the poly(alkylene oxide) glycol in part 1.B.(1)(B)(b) equals at least 35 but does not exceed 80,
   2. a second polyetherester comprised of
      A. a dicarboxylic acid component comprised of terephthalic acid, and
      B. a diol component comprised of
         a. a glycol comprised of 90–60 mole percent 1,4-cyclohexanedimethanol and 10–40 mole percent ethylene glycol or tetramethylene glycol, and
         b. 10–50 weight percent, based on the weight of the polyetherester, of a poly(alkylene oxide)

glycol having 2 to 4 carbon atoms in the repeating unit and having a molecular weight in the range of 400 to 2,000, C. from 2 to 15 weight percent of a radial teleblock copolymer prepared by a method which comprises polymerizing monomers selected from the group consisting of conjugated dienes and vinyl-substituted aromatic compounds in the presence of an organomonolithium initiator and reacting the resulting mono-lithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

2. The composition of claim 1 wherein the first polyetherester of part 1.B.(1) is comprised of
   A. a dicarboxylic acid component comprised of
      a. 85-60 mole percent terephthalic acid, and
      b. 15-40 mole percent of 1,4-cyclohexanedicarboxylic acid,
   B. a diol component comprised of
      a. 100 mole percent of a glycol comprised of tetramethylene glycol, and
      b. 20-50 weight percent, based on the weight of the polyetherester, of poly(tetramethylene oxide) glycol having a molecular weight in the range of 800-4,000.

3. The composition of claim 1 wherein the second polyetherester of part 1.B.(2) is comprised of
   A. a dicarboxylic acid component comprised of terephthalic acid, and
   B. a diol component comprised of
      a. a glycol comprised of 80-65 mole percent 1,4-cyclohexanedimethanol and 20-35 mole percent tetramethylene glycol, and
      b. 20-40 weight percent, based on the weight of the polyetherester, of poly(tetramethylene oxide) glycol having a molecular weight in the range of 400 to 2,000.

4. The composition of claim 1 wherein the conjugated dienes and vinyl-substituted aromatic compounds in part 1.C. are butadiene and styrene.

5. The composition of claim 4 wherein the amount of butadiene is 60 to 80 mole percent and the amount of styrene is 40 to 20 mole percent.

6. The composition of claim 1 wherein the amount of component A. is 90 to 83 weight percent, the amount of component B. is 5 to 10 weight percent and the amount of component C. is 5 to 7 weight percent.

7. A composition comprised of, based on the weight of the composition, an admixture of
   A. from 90 to 83 weight percent poly(tetramethylene terephthalate) having an inherent viscosity of at least 0.5,
   B. from 5 to 10 weight percent of a polyetherester having an inherent viscosity of at least 0.4 comprised of
      1. a dicarboxylic acid component comprised of terephthalic acid, and
      2. a diol component comprised of
         a. a glycol comprised of 80-70 mole percent 1,4-cyclohexanedimethanol and 20-30 mole percent tetramethylene glycol, and
         b. 25-35 weight percent, based on the weight of the polyetherester, of poly(tetramethylene oxide) glycol having a molecular weight of about 1,000,
   C. from 5 to 7 weight percent of a radial teleblock copolymer prepared by a method which comprises polymerizing from 60 to 80 mole percent butadiene and 40 to 20 mole percent styrene in the presence of an organomonolithium initiator and reacting the resulting monolithium-terminated polymer with from 0.1 to about 1 equivalent based on the lithium in the polymer of a compound having at least three reactive sites capable of reacting with the carbon-lithium bond of the polymer, exclusive or organic reactant materials having halogen atoms that are attached to a carbon atom which is alpha to an activating group selected from the group consisting of an ether linkage, a carbonyl and a carbon-to-carbon double bond, thereby coupling said polymer with said compound.

* * * * *